May 19, 1959     I. B. LUECK ET AL     2,886,921

METHOD AND APPARATUS FOR TOUGHENING LENSES

Filed April 27, 1956

INVENTORS
IRVING B. LUECK
BY MICHAEL FRIEDMAN

ATTORNEY

United States Patent Office 2,886,921
Patented May 19, 1959

2,886,921

METHOD AND APPARATUS FOR TOUGHENING LENSES

Irving B. Lueck, Perinton, and Michael Friedman, Irondequoit, N.Y., assignors to Bausch & Lomb Optical Company, Rochester, N.Y., a corporation of New York Application April 27, 1956, Serial No. 581,075

3 Claims. (Cl 49—45)

This invention relates to goggle and spectacle lenses and more particularly it has reference to a method and means for toughening or tempering such lenses in order to make them more resistant to impact and pressure on the surfaces or edges thereof.

Under the prior art practices, such lenses are toughened or tempered by heating them to a point slightly below their softening point and then quenching or cooling the heated lenses by immersion in a suitable liquid bath or, more commonly, by blowing air blasts onto the surfaces of the heated lenses. With the prior art methods of air cooling or quenching, the air blasts are usually emitted from relatively small orifices or jets so arranged that an air blast is directed substantially normal to each surface of the lens. While the prior art methods provide lenses having some increased resistance to impact on the surfaces thereof, such lenses do not have maximum resistance to impact on the faces thereof nor do they always have resistance to impact or pressure on the edges and so may break from the pressure which is applied to the edges of the lenses when they are mounted in rims.

One of the objects of our invention is to provide an improved method and means for toughening or tempering goggle and spectacle lenses which will overcome the disadvantages and defects of the prior art. Another object is to provide a method of toughening or tempering goggle and spectacle lenses which will render the lenses more resistant to impact or pressure applied to the edges thereof. A further object is to provide a method of toughening goggle and spectacle lenses which will render the lenses much more resistant to surface impact than those of the prior art. Still another object is to provide an improved means for toughening goggle and spectacle lenses which will be convenient and efficient in use, yet relatively simple in structure. These and other objects and advantages will be more fully described and pointed out in the appended claims.

Referring to the drawings.

Figures 1, 2:
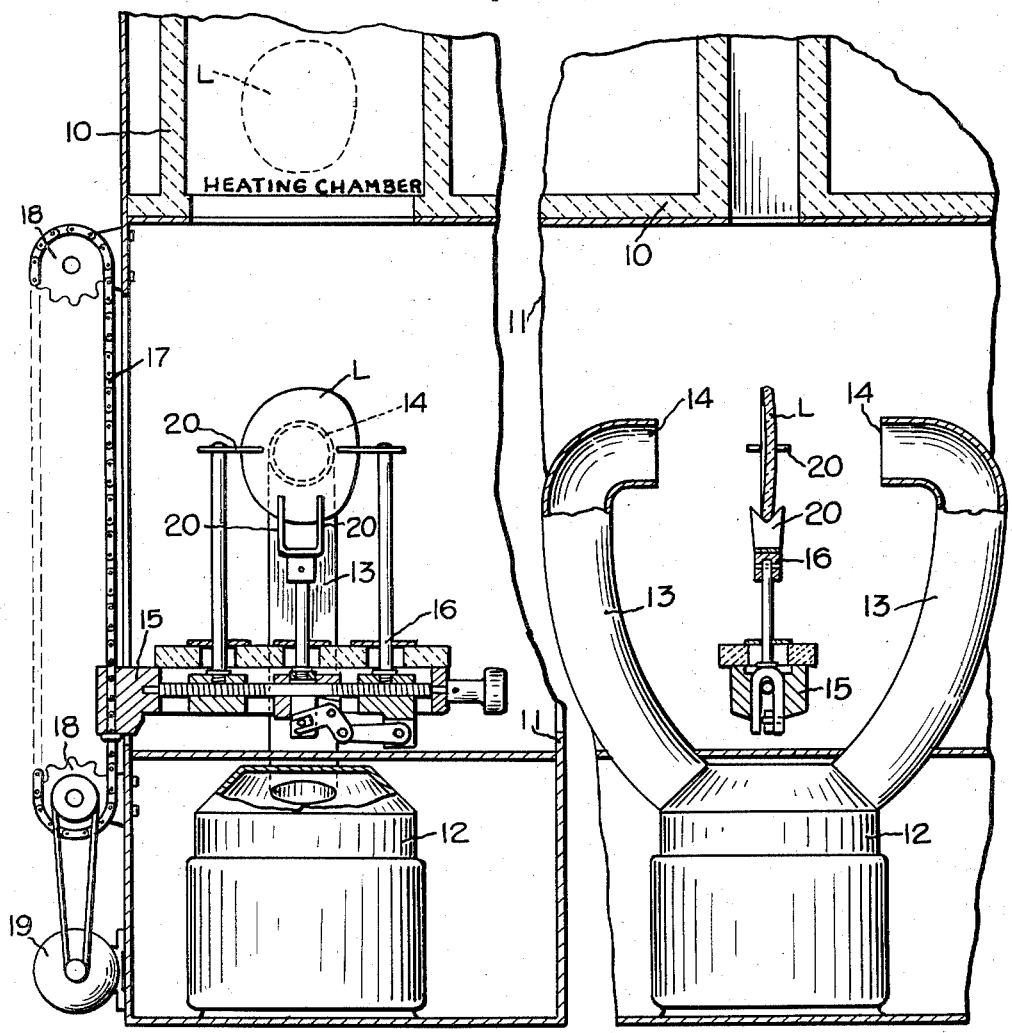
Fig. 1 is a fragmentary vertical sectional view of one type of apparatus embodying our invention and adapted to carry out our improved method.
Fig. 2 is a substantially similar view at right angles thereto.

One form of apparatus which may be used in the practice of our invention is shown in the drawings wherein 10 indicates a suitable furnace supported at the top of a casing 11. A motor driven air compressor or blower 12 is mounted within the casing 11 at the lower portion thereof. Two spaced conduits 13 extend upwardly from the plenum chamber of the blower and terminate in the spaced, aligned nozzles 14 which face each other. Movably mounted within the casing 11 is the table 15 which supports an adjustable lens holding means for supporting a lens L in a substantially vertical plane midway between the two spaced nozzles 14. The table 15 may be raised and lowered by any suitable means such as the link chain 17 and sprockets 18 driven by motor 19. By this mechanism the lens L, which is to be toughened, may be raised into the furnace to the dotted line position shown in Fig. 1 and then lowered to quenching position between the two nozzles 14. The sequential operations of the motor 19 and blower 12 are controlled by suitable time-controlled switches, not shown.

Under the prior art methods, the air blasts are directed onto the lens surfaces through relatively small orifices or jets. We have discovered, however, that improved results are obtained when each of the nozzle openings has an area of .44–1.23 sq. inches and is shaped so that horizontal and vertical dimensions are related to each other in a ratio from 1/1 to 2/1. In addition, the nozzles must be spaced from each other a distance of 5 to 7 inches and the air, at room temperature, must flow through the nozzles at a total rate of 50–80 cu. ft. per minute or 25–40 cu. ft. per minute through each nozzle. We have, for example, obtained good results in the practice of our invention by making the nozzles each 1 inch in diameter and spacing them six inches apart and supplying air at the rate of a total through both nozzles of about 75 cu. ft. per minute. The blower 12 is preferably of the turbine type, with no back pressure, but capable of delivering enough pressure to cause flow of the air at the rate specified. The diameter of the conduit 13 is substantially the same as that of the nozzle 14. While we have shown the nozzles 14 as having a round or circular shape, it is to be understood that non-circular shapes could also be used providing they meet the specifications as to area and shape hereinbefore specified. If the nozzle openings are circular, the diameters may range from .75–1.25 inches and fall within the specified limits as to shape and area.

In operation, the lens L to be toughened is placed on the spaced V-shaped supports 20 carried by the table 16. The supports 20 are preferably formed of stainless sheet steel .010–.015 inch thick so that they will not disturb the cooling of the lens in localized areas. The lens L is then moved into the furnace 10 by the elevating mechanism and held there at such temperature and for such time as to establish a uniform temperature gradient while heating the lens to a point slightly below its softening point. With temperature of the furnace maintained constant, for example at 1180° F., the time during which the lens L is held in the furnace will vary with the size and weight of the lens as well as with its chemical composition. In commercial practice, convenience is attained by the use of suitable tables giving the heating periods for various sizes and kinds of lenses. The lens must be heated to a temperature just below its softening point and not enough to produce undesirable deformation in the polished surfaces thereof. When the heating cycle has been completed, the lens L is moved downwardly from the furnace 10 to the quenching or cooling position between the nozzles 14 which are substantially normal to the lens surfaces. The air blower 12 is then immediately energized so that air at room temperature is delivered onto each surface of the lens at a rate of 25–40 cu. ft. per minute. The air blower 12 continues to operate for about 45–60 seconds and at the end of that time the lens L has been cooled to such an extent that it may be removed from the support with the bare hand.

With our improved method and apparatus a goggle lens having no prescriptive power and a minimum thickness of 3.5 mm. can be toughened or tempered so that it will withstand the impact of a steel ball, at least 1½ inches in diameter, falling freely from a height of 50 inches. Spectacle lenses having a minimum thickness of 2.2 mm. have been toughened by our method and apparatus so that they will not break when struck by a steel ball of at least ⅞ inch diameter falling freely a distance of 50 inches. The lenses must, of course, be properly surface and be free from surface cracks, chips, and defects. Our method and apparatus have been used successfully to toughen lenses which range in size from children's spectacle lenses, with a major dimension of about 28 mm., to large goggle lenses with a major dimension of 62 mm.

Figure 3:
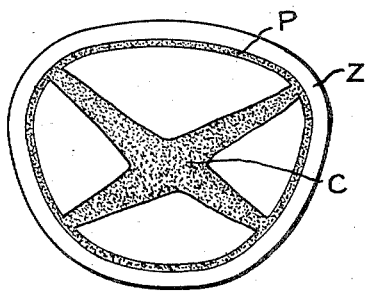
Fig. 3 is a diagrammatic view showing a pattern which is visible when a lens toughened by our invention is viewed in a polariscope.

A lens which has been toughened or tempered has an outer or surface volume in a state of compression while its inner volume is under tension. When such a lens is examined in plane polarized light in a polariscope, a strain pattern is visible. If the quenching medium has been applied substantially symmetrically to the lens surfaces, a well defined, centrally positioned cross will be visible as shown at C in Fig 3. If such a lens is flat and has parallel edges which are ground and polished so that it may be examined edgewise in a polariscope, there will be visible a dark, continuous line which marks the boundary between the balanced forces of compression and tension. When the lens is viewed normally to the surface in a polariscope, this boundary line is also visible as a black line spaced inwardly from the periphery of the lens, as shown at P in Fig. 3. Such a dark line spaced inwardly from the periphery of the lens indicates the boundary between the zone of tension and the zone of compression and the presence of such a peripheral zone Z is an indication that the lens has increased resistance to pressure or impact applied to its edges.

Lenses which have been toughened, tempered or heat treated by our improved method always have a peripheral compression zone Z so that they have increased resistance to pressure or impact applied to their edges. However, lenses which have been treated by prior art methods do not always have a peripheral zone of compression. In such prior art lenses the peripheral zone tends to be circular in outline so that in a non-circular lens the black line boundary of the peripheral zone usually coincides with the edge of the lens at one point at least. Even though such a lens may have resistance to impact on its surfaces, it would very likely break when pressure is applied to its edge by mounting in an encircling rim. When smaller sized lenses, such as those used in children's spectacles, are tempered by the prior art methods, the peripheral boundary line usually coincides with the edge of the lens thereby indicating the absence of a peripheral compression zone so that the lens would have no increased resistance to edge impact or pressure. Under our improved method, lenses of all sizes exhibit a peripheral zone of compression. While strongly curved plus lenses toughened under our method may not exhibit the inwardly spaced boundary line between the zones of tension and compression, the presence of the compression zone will be indicated by a contrast difference.

When a lens is heat treated or toughened under our method or those of the prior art, the size of the lens is slightly increased so that it is often necessary for the optician to grind a little off the edge of the lens in order to insure proper fit in the lens rim. This can be accomplished readily and safely with lenses treated by our method since there is an ample zone of compression around the periphery of the lens. With lenses treated under the prior art methods, however, such an edging operation would frequently render the lens less resistant to edge pressure because such an operation might remove enough of the inadequate compression zone to bring the black boundary line at the edge of the lens.

From the foregoing, it will be apparent that we are able to attain the objects of our invention and provide an improved method and means for toughening or tempering spectacle and goggle lenses. Various modifications may obviously be made without departing from the spirit of our invention as pointed out in the appended claims.

We claim:

1. The method of toughening a spectacle or goggle lens which comprises the steps of heating the lens to a temperature slightly below its softening point, and thereafter cooling the lens by directing for about one minute onto each of the opposite sides thereof a blast of air at room temperature at the rate of 25–40 cu. ft. per minute through aligned oppositely directed nozzles spaced 5–7 inches apart and each having an opening with an area of .44–1.23 sq. inches and a shape such that the horizontal and vertical dimensions have a ratio of from 1/1 to 2/1 whereby the lens will be toughened to increase its resistance to impact on the surfaces and edge thereof.

2. The method of toughening a spectacle or goggle lens to increase its resistance to impact or pressure applied to the surfaces or edge thereof which comprises heating the lens to a temperature which is approximately at its softening point but not high enough to produce undesired deformation in a surface thereof and immediately thereafter cooling the lens by holding it for at least one minute with its respective surfaces substantially normal to opposed streams of air at room temperature flowing at a rate of 25–40 cu. ft. per minute over each surface of the lens from two opposed nozzles each having a diameter of .75–1.25 inches and separated by 5–7 inches whereby the lens is toughened and rendered more resistant to impact and pressure.

3. In an apparatus for toughening a goggle lens or the like having means for heating the lens and thereafter quenching it in air blasts, the improvement which comprises a pair of nozzles facing each other, each nozzle having an opening with an area of from .44–1.23 sq. inches and a shape such that the horizontal and vertical dimensions have a ratio of 1/1 to 2/1, said nozzles being spaced apart a distance of 5–7 inches, means for holding the lens to be quenched midway between the nozzles with the lens surfaces substantially normal to the nozzles and means for directing air at substantially room temperature through said nozzles at a total rate of 50–80 cu. ft. per minute.

References Cited in the file of this patent

UNITED STATES PATENTS

| | | |
|---|---|---|
| 2,409,284 | Jackson | Oct. 15, 1946 |
| 2,577,611 | Eves | Dec. 4, 1951 |
| 2,695,475 | Ellis | Nov. 30, 1954 |

FOREIGN PATENTS

| | | |
|---|---|---|
| 457,292 | Canada | June 7, 1949 |